US010726001B2

(12) United States Patent
Dolbear et al.

(10) Patent No.: US 10,726,001 B2
(45) Date of Patent: Jul. 28, 2020

(54) DISCOVERY AND MANAGEMENT OF PHYSICAL COMPONENTS

(71) Applicant: Oracle International Corporation, Redwood Shores, CA (US)

(72) Inventors: Michael James Dolbear, Boulder, CO (US); Jon Mark Holdman, Wheat Ridge, CO (US)

(73) Assignee: Oracle International Corporation, Redwood Shores, CA (US)

( * ) Notice: Subject to any disclaimer, the term of this patent is extended or adjusted under 35 U.S.C. 154(b) by 186 days.

(21) Appl. No.: 15/665,318

(22) Filed: Jul. 31, 2017

(65) Prior Publication Data

US 2019/0034478 A1 Jan. 31, 2019

(51) Int. Cl.
*G06F 16/23* (2019.01)
*G06F 9/50* (2006.01)
*G06F 9/455* (2018.01)
*G06F 8/65* (2018.01)

(52) U.S. Cl.
CPC ............ *G06F 16/2379* (2019.01); *G06F 8/65* (2013.01); *G06F 9/45558* (2013.01); *G06F 9/5022* (2013.01); *G06F 2009/45583* (2013.01); *G06F 2009/45595* (2013.01)

(58) Field of Classification Search
CPC ...... G06F 16/2379; G06F 8/65; G06F 9/5022; G06F 9/45558; G06F 2009/45583; G06F 2009/45595
See application file for complete search history.

(56) References Cited

U.S. PATENT DOCUMENTS

| | | | | |
|---|---|---|---|---|
| 5,983,369 A | * | 11/1999 | Bakoglu | G06F 11/2294 714/25 |
| 7,805,640 B1 | * | 9/2010 | Newstadt | G06F 11/3419 714/38.1 |
| 2004/0039561 A1 | * | 2/2004 | Montano | G06F 9/4411 703/22 |
| 2009/0122988 A1 | * | 5/2009 | Schuba | H04L 9/0825 380/277 |
| 2012/0159510 A1 | * | 6/2012 | Kumar | G06F 9/544 718/105 |
| 2016/0182284 A1 | * | 6/2016 | Ayanam | H04L 41/0806 709/222 |
| 2017/0242758 A1 | * | 8/2017 | Chou | G06F 1/3287 |
| 2018/0107410 A1 | * | 4/2018 | Barajas Gonzalez | G06F 3/067 |
| 2018/0247081 A1 | * | 8/2018 | Helsel | G06F 21/44 |
| 2018/0336024 A1 | * | 11/2018 | Klische | G06F 8/65 |

* cited by examiner

*Primary Examiner* — Robert W Beausoliel, Jr.
*Assistant Examiner* — Mohammad Solaiman Bhuyan
(74) *Attorney, Agent, or Firm* — Invoke

(57) ABSTRACT

Techniques for discovery and management of physical components are disclosed. A push notification from a physical component is received. The push notification includes an announcement that the physical component has been physically coupled with a system. Responsive to receiving the push notification, the system registers the physical component. The system receives push notifications from physical component. Based on the push notifications, the system determines an operational status of the physical component.

20 Claims, 10 Drawing Sheets

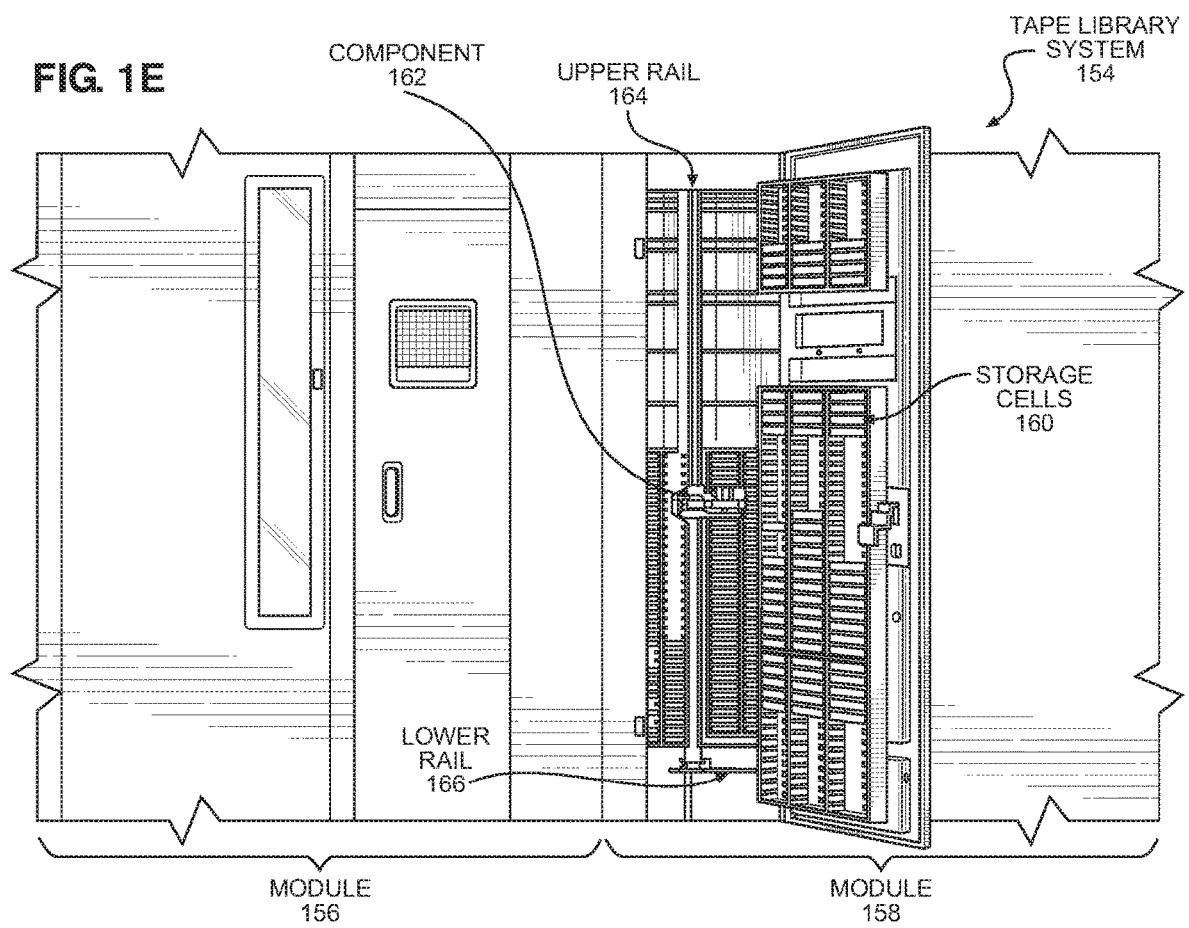

FIG. 5

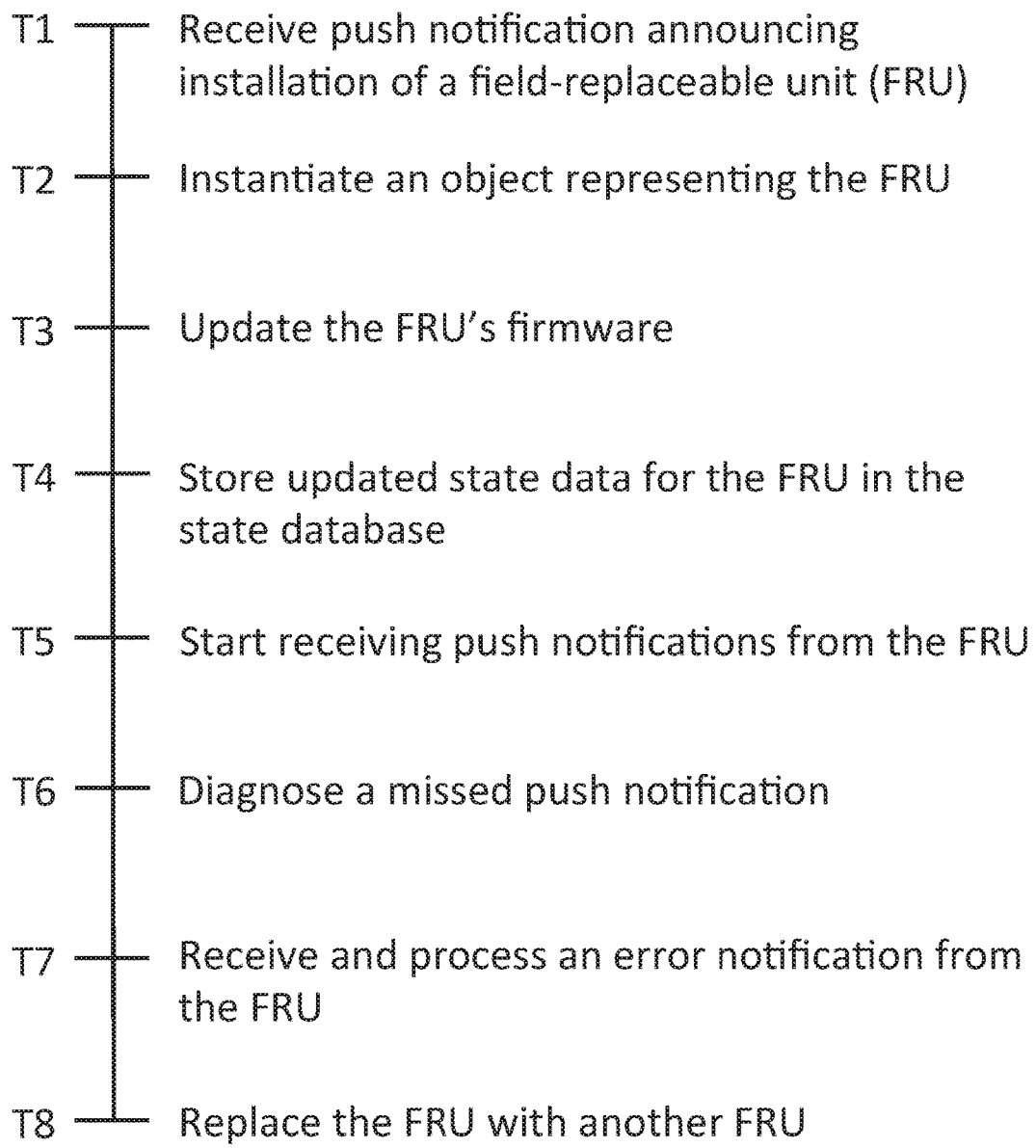

T1 — Receive push notification announcing installation of a field-replaceable unit (FRU)

T2 — Instantiate an object representing the FRU

T3 — Update the FRU's firmware

T4 — Store updated state data for the FRU in the state database

T5 — Start receiving push notifications from the FRU

T6 — Diagnose a missed push notification

T7 — Receive and process an error notification from the FRU

T8 — Replace the FRU with another FRU

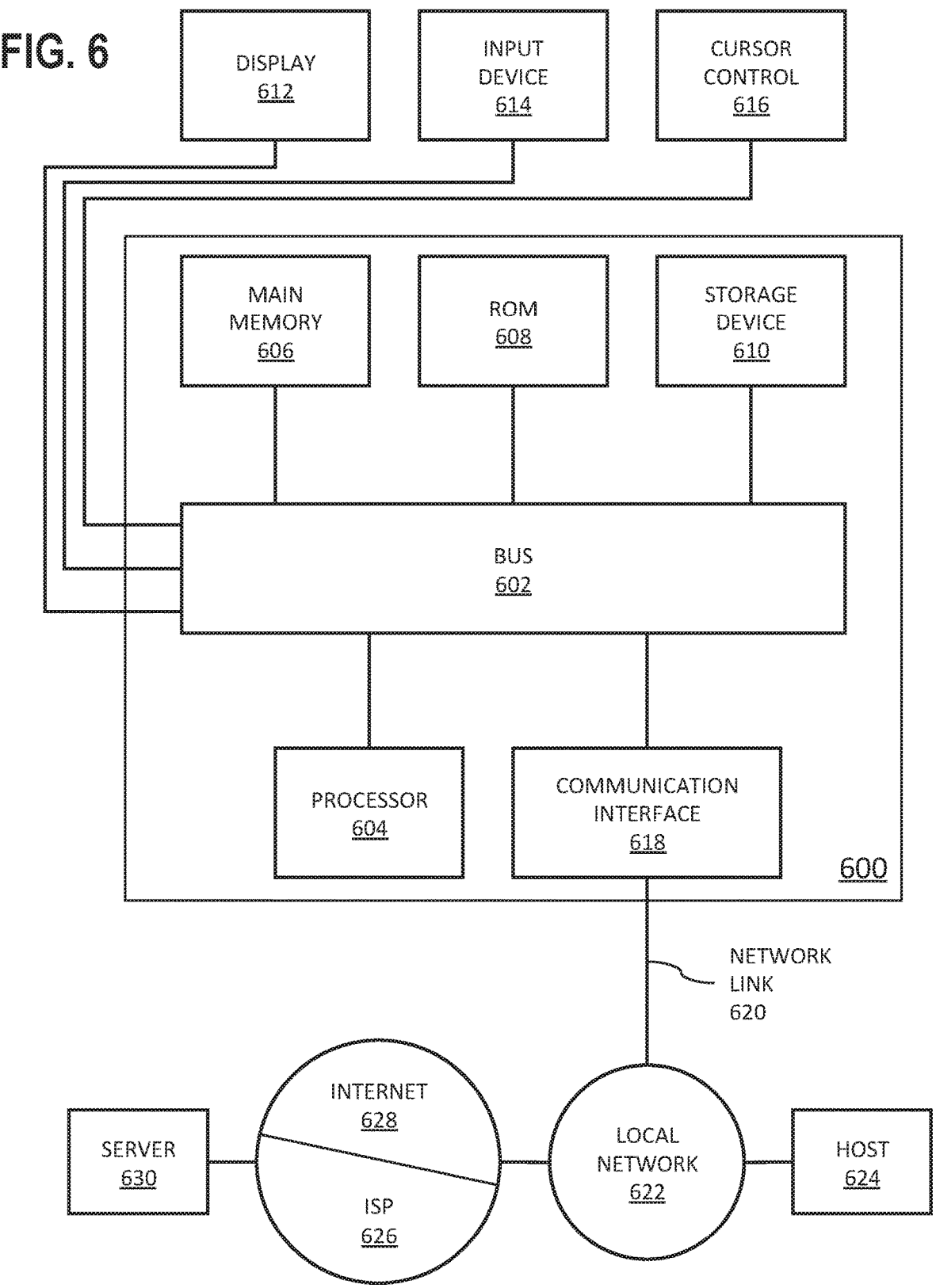

DISCOVERY AND MANAGEMENT OF PHYSICAL COMPONENTS

TECHNICAL FIELD

The present disclosure relates to physical components. In particular, the present disclosure relates to discovery and management of physical components.

BACKGROUND

A system may have one or more physical components. Further, the system may allow for components to be added and/or removed. Components may be added or removed at runtime and/or while the system is powered down. Adding or removing a component in the system may change the functionality available to and/or provided by the system. Further, adding or removing a component in the system may have an impact on other components in the system. For example, adding a component may require that the component share resources (e.g., computing cycles, physical space, memory, network bandwidth, etc.) with other resources in the system. The system may be responsible for managing the different components in the system, and may further be responsible for allocating system resources between the different components.

In addition, a component in the system may fail. For example, the component may experience a hardware failure (e.g., overheating, breakage, uncoupling from the system, or some other type of failure relating to physical hardware), a software malfunction (e.g., an infinite loop, a memory leak or fault, division by zero, or some other type of failure relating to code execution), or some other type of malfunction. The failure may render the component inoperable or otherwise unreliable. For example, the component may experience unusually high latency and/or become unresponsive. When a component fails, some sort of system recovery may be needed, such as restarting, reinitializing, and/or replacing the component.

In some systems, a polling approach is used to determine when components are added and/or removed. Specifically, a controller may transmit a message to a particular network address in the system, corresponding to the potential location of a component, and wait for a response indicating that a component is located at that address. Polling may be repeated, periodically, for each electronic address in the system. Polling allows the system to determine whether components are located at different addresses, but carries significant overhead, because the system must poll each and every location periodically. Thus, polling may consume valuable system resources such as computing cycles, bandwidth, memory, etc.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1E is an illustration of a tape library system in accordance with one embodiment;

FIG. 5 illustrates an example of a sequence of operations for discovery and management of a physical component in accordance with one embodiment; and FIG. 6 shows a block diagram illustrating a computer system in accordance with one embodiment.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW AND EXAMPLES
3. DISCOVERY AND MANAGEMENT OF PHYSICAL COMPONENTS
4. REGISTERING A PHYSICAL COMPONENT
5. ILLUSTRATIVE EXAMPLE
6. MISCELLANEOUS; EXTENSIONS
7. HARDWARE OVERVIEW
8. COMPUTER NETWORKS AND CLOUD NETWORKS

1. GENERAL OVERVIEW

A push notification from a physical component is received. The push notification includes an announcement that the physical component has been physically coupled with a system. Responsive to receiving the push notification, the system registers the physical component. The system receives push notifications from physical component. Based on the push notifications, the system determines an operational status of the physical component.

One or more embodiments described in this Specification and/or recited in the claims may not be included in this General Overview section.

2. ARCHITECTURAL OVERVIEW AND EXAMPLES

Figure 1A:
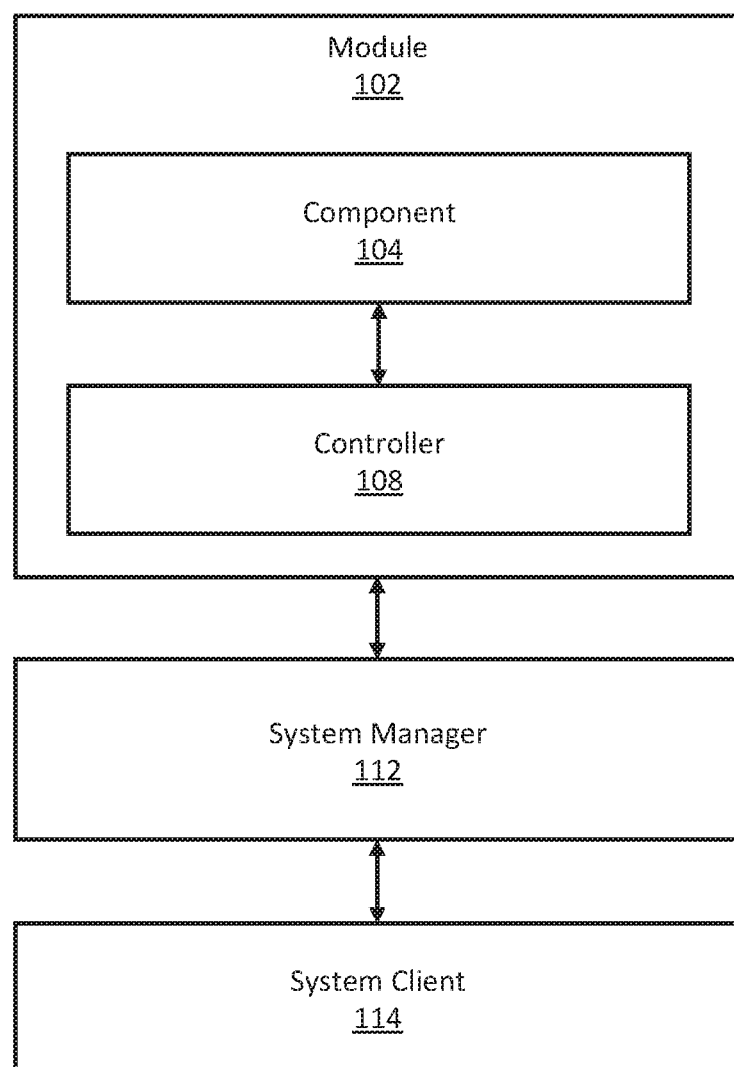
FIG. 1A is a block diagram illustrating a system in accordance with one embodiment.

FIG. 1A illustrates a system 100 in accordance with one or more embodiments. As illustrated in FIG. 1A, system 100 includes a module 102 that includes a component 104 and a corresponding controller 108. The system 100 also includes a system manager 112 and a system client 114. In one or more embodiments, the system 100 may include more or fewer components than the components illustrated in FIG.

1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 8, titled "Computer Networks and Cloud Networks."

In one embodiment, the module 102 is a physical unit that includes (i.e., physically within or via a physical connection) at least one component 104. The component 104 is a physical device, the operation of which is adjustable by a servomechanism (not shown). For example, the module 102 may be a vending machine, an industrial machine (e.g., operating in a production line, farm, or warehouse), a printer (e.g., an ink printer, laser printer, or 3-dimensional printer), a medical or scientific device (e.g., an automated pill sorter or substrate mixer), a vehicle (e.g., a railway car or self-driving automobile), an entertainment device (e.g., an amusement park ride or arcade machine), a household device (e.g., a vacuum cleaner or kitchen appliance), a digital storage device (e.g., a hard drive or storage library), a network switch, or any other kind of physical unit in which the operation of a component 104 is adjustable by a servomechanism. Those skilled in the art will appreciate that the foregoing list is not exhaustive and is provided merely by way of example.

While FIG. 1A illustrates only one component 104, the module 102 may include more than one component. For example, as discussed below, a storage library may include multiple robotic arms handling the storage devices managed by the storage library. Many different types of modules that include multiple components exist. Further, the module 104 may be combined with other modules (not shown), and/or the module 104 may be a combination of multiple sub-modules. For example, a storage library may include more than one inter-compatible storage library modules.

In one embodiment, the controller 108 is a digital device that helps control operation of the component 104. Specifically, the controller 108 may be configured to apply electrical signals to the component 104, to control the velocity, position, direction, and/or other operational properties of the component 104. If the module 102 includes multiple components, each component may be associated with a separate controller. Alternatively or in addition, multiple components may be associated with the same controller, and/or a single component may be associated with multiple controllers.

In one embodiment, the controller 108 is configured to perform servomechanism operations for the component 104. Specifically, the controller 108 may be configured to receive feedback associated with the component 104 and, based on the feedback, adjust operation of the component 104. The controller 108 may adjust operation of the component 104 by applying new electrical signals to the component 104 and/or modifying electrical signals that are already being applied to the component 104.

In one embodiment, the controller 108 is directly coupled to the component 104 in a manner that causes the controller 108 to physically move with the component 104. For example, a controller for a robotic arm may be directly connected to the arm itself, so that when the arm moves, the controller is carried along with it. Alternatively, the controller 108 may be remotely coupled to the component 104 (e.g., through a network cable) so that the controller 108 does not move with the component 104.

In one embodiment, the system manager 112 is configured to manage operation of the module 102. Specifically, the system manager 112 may issue instructions to the controller 108, which in turn controls operation of the component 104 based on those instructions. For example, in storage library where the component 104 is a robotic arm, the system manager 112 may issue instructions to the controller 108 to remove a particular storage device. Based on those instructions, the controller 108 may apply electrical signals to the component 104 (i.e., the robotic arm in this example) so that the component 104 moves to the location of the storage device in the module 102 and removes the storage device. While the system manager 112 is shown in FIG. 1A as being separate from the module 102, the system manager 112 may itself be a component of the module 102. For example, if the module 102 is a storage library, the system manager 112 may be a server housed in the storage library enclosure.

In one embodiment, the system manager 112 receives instructions from a system client 114. Specifically, the system client 114 may be a computing device operating separately from the module 102 and system manager 112, for which the module 102 provides services. The system client 112 may be a web server or host, such as a server providing cloud-based services for multiple tenants (not shown). Accordingly, the system client 114 may have clients of its own, corresponding to the various tenants. In this example, the module 102 is part of the underlying infrastructure providing cloud-based services for the tenants. Cloud networks are discussed in further detail below. Alternatively or in addition, a system client 114 may be a tenant system or some other type of end user of the module 102. Further, the system 100 may include multiple system managers, and/or the system 100 may include multiple system clients communicatively coupled with each system manager.

In one embodiment, elements of the system 100, such as the controller 108, system manager 112, and/or system client 114, are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 1B:
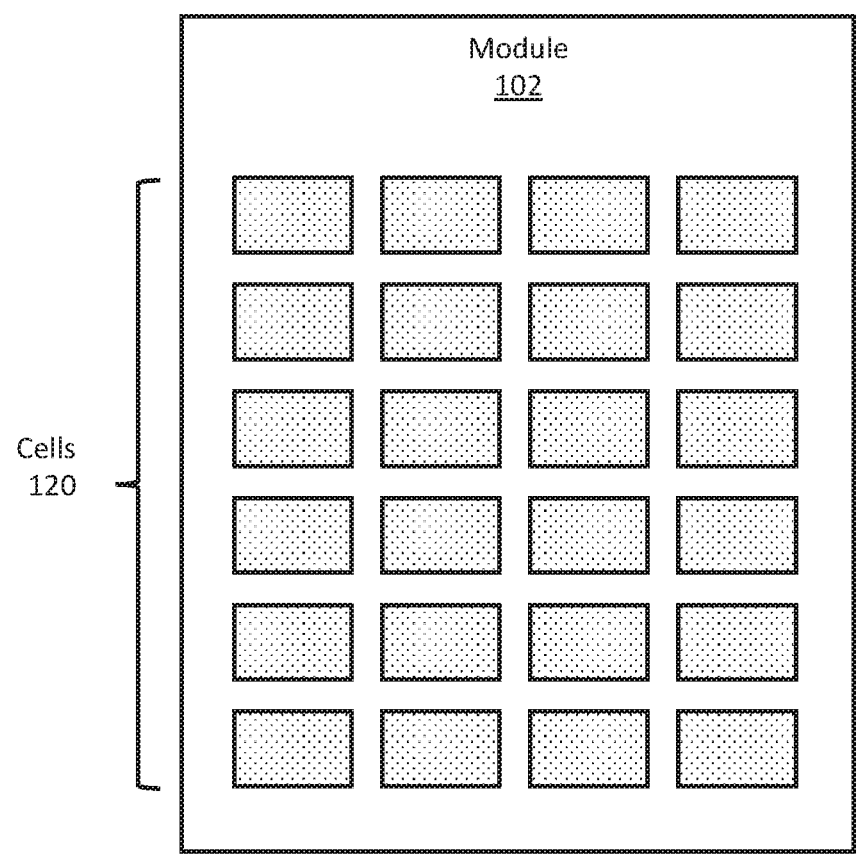
FIGS. 1B and 1C are block diagrams illustrating a module in accordance with one embodiment.

FIG. 1B is a block diagram illustrating a module 102 in accordance with one embodiment. Specifically, FIG. 1B illustrates an abstracted cross-section of a module 102 in accordance with one embodiment. The module 102 includes multiple cells 120 on which components (not shown in FIG. 1B) of the module 102 are configured to operate. In general, referring to FIG. 1B, the term "cells" may refer to a set of similar physical locations in the module 102. For example, if the module 102 is a vending machine, the cells 120 may be so-called "columns" corresponding to particular product selections. If the module 102 is a storage library, the cells 120 may be slots into which storage media (e.g., drives, disks, cartridges, etc.) are inserted. If the module 102 is a network switch, the cells 120 may be physical ports into which cables are inserted. The cells 120 may not be all of the same type. For example, in a storage library, some of the cells 120 may be general-purpose storage cells accepting different types of storage media, while others of the cells 120 may be specific types of storage cells accepting only a particular type of storage media, such as tape cartridges. Many different types of modules exist having different kinds of cells.

In one embodiment, the module 102 includes components in addition to cells or other than cells. In general, the module 102 may include many different types of electronic components, such as a power supply, network connection, sensors, display, storage device, service port, and/or any other type of appropriate electronic component depending on the specific type of module 102.

Figure 1C:
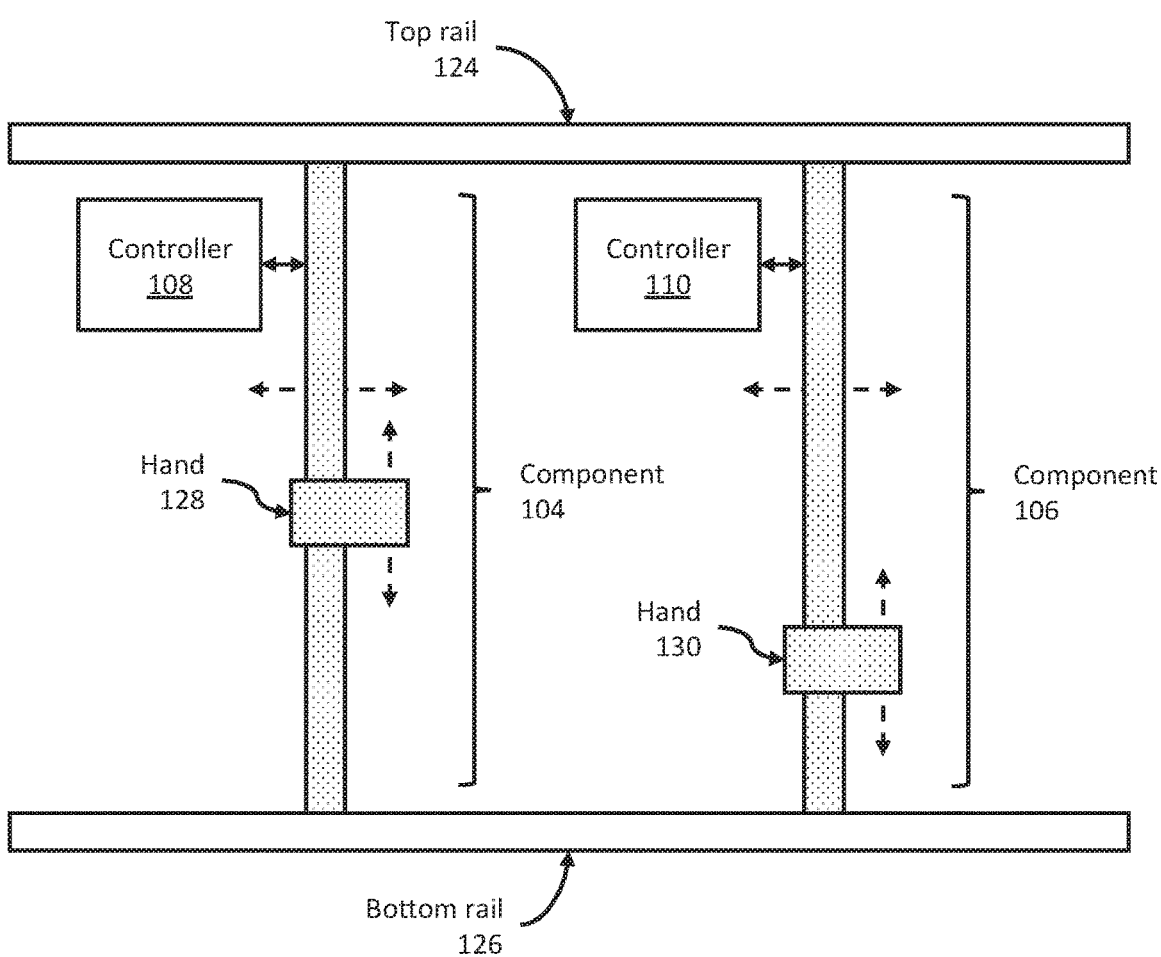

For example, FIG. 1C is a block diagram illustrating a module 102 in accordance with one embodiment. As illustrated in FIG. 1C, the module 102 includes two components 104, 106 operating along a top rail 124 and a bottom rail 126. As used here, the terms "top" and "bottom" are used to differentiate between the rails and may not accurately denote the vertical configuration of the top rail 124 and bottom rail 126 relative to each other. For example, the top rail 124 and bottom rail 126 may be on a same horizontal plane as each other, with FIG. 1C representing an overhead view of the module 102. Many different physical rail configurations may be used. Further, the module 102 may not include any rails, may include more than two rails, or may include only a single rail.

In one embodiment, component 104 has a hand 128 and component 106 has a hand 130. The hands 128, 130 are physical mechanisms used to manipulate other components and/or items in the module 102. For example, the hands 128, 130 may be used to manipulate items placed in cells in the module 102, such as the cells 120 illustrated in FIG. 1B. In one embodiment, the components 104, 106 are configured to follow one axis (e.g., horizontally) along the top rail 124 and bottom rail 126, while the hands 128, 130 are configured to follow another axis (e.g., vertically) along the components 104, 106. In this manner, the hands 128, 130 may be able to reach many different locations within the module 102. Further, if the module 102 has more than one rail, a component may have more than one motor (not shown), with each motor affecting movement of the component along the corresponding rail. In an embodiment, rails in multiple modules and/or sub-modules may be connected, allowing one or more components to move between the modules and/or sub-modules. For example, in a tape library system, robot arms may be able to move from one tape library module to another tape library module, along one or more interconnected rails.

In one embodiment, each of the components 104, 106 has a corresponding controller 108, 110. Each controller is configured to apply electrical signals to its corresponding component, to control movement of the component within the module 102. As illustrated in FIG. 1C, each controller 108, 110 may be directly connected to its corresponding component 104, 106, so that when the component travels along the top rail 124 and bottom rail 126, the corresponding controller moves along with it. Alternatively, one or more of the controllers 108, 110 may be remotely connected to its corresponding component, so the controller does not move with the component.

Figure 1D:
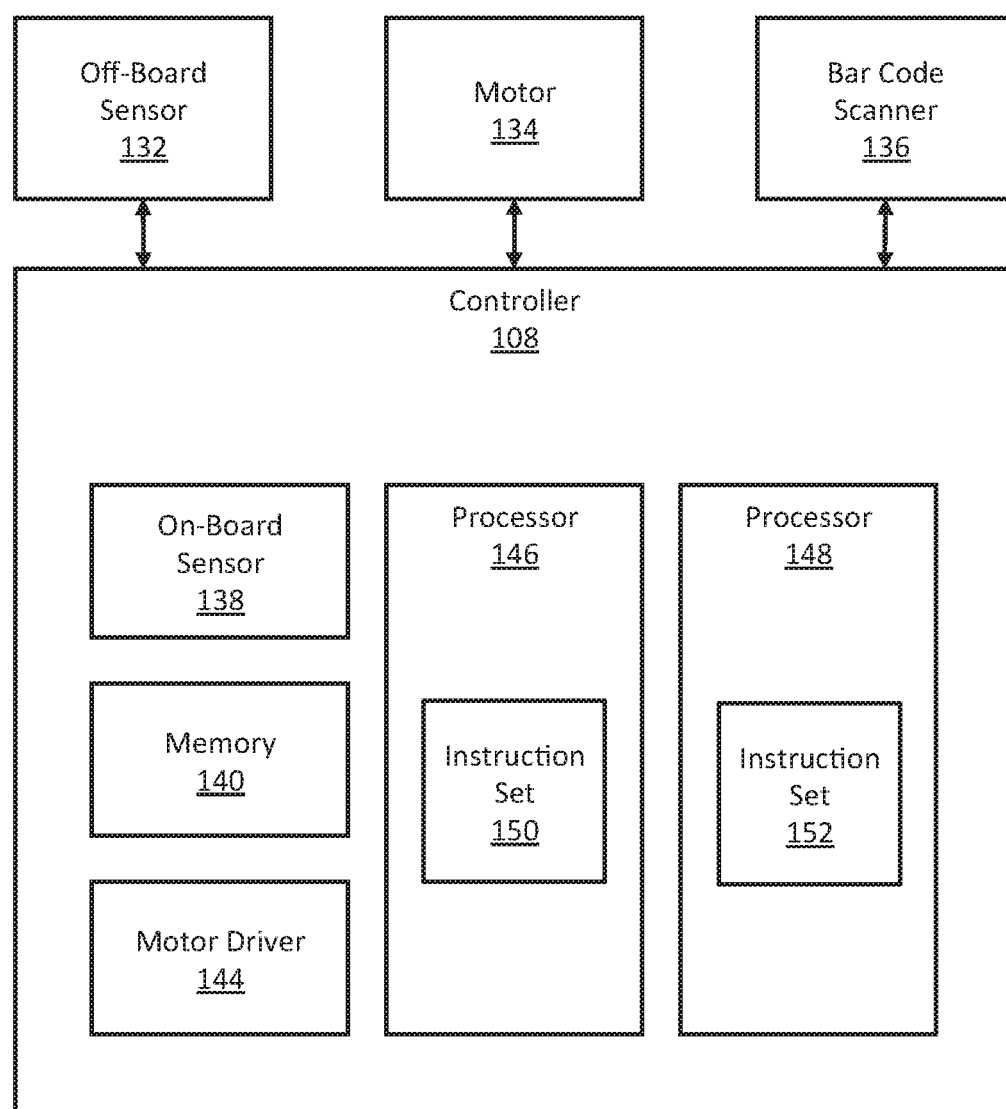
FIG. 1D is a block diagram illustrating a controller in accordance with one embodiment.

FIG. 1D is a block diagram illustrating a controller 108 in accordance with one or more embodiments. The controller 108 is configured to control the operation of a component (not shown) in a module (not shown). The controller 108 may be a logic board, server, or any other type of computing structure or device suitable to perform controller operations described herein.

In one embodiment, the controller 108 includes one or more processors. As illustrated in FIG. 1D, the controller 108 includes two processors; processor 146 and processor 148. Each processor 146, 148 operates using a corresponding instruction set. Specifically, processor 146 uses instruction set 150, and processor 148 uses instruction set 152. The processors 146, 148 may be of the same type or may be of different types. For example, processor 146 may use a general purpose instruction set 150 and processor 148 may use a specialized instruction set 152. In one embodiment, the specialized instruction set 152 includes floating point operations that allow processor 148 to perform mathematical functions for a servomechanism more rapidly than processor 146 would be able to perform those same mathematical functions using the general purpose instruction set 150. For example, a general-purpose processor may be an Advanced RISC Machines (ARM) processor based on the Reduced Instruction Set Computer (RISC) design and the other processor may be a Digital Signal Processing (DSP) processor optimized for digital signal processing including floating point operations. Specifically, the DSP processor may be optimized for measuring, filtering, and/or compressing digital or analog signals, which may involve performing complex mathematical calculations. Performing those calculations quickly may help avoid performance concerns associated with latency and/or offload mathematical calculations from the general purpose processor. The DSP processor may also include fewer transistors and/or use less power than the general-purpose processor. In one embodiment, a general-purpose processor executes instructions relating to high-level commands and general system operations, while a specialized processor handles complex mathematical functions.

In one embodiment, the controller 108 also includes one or more non-transitory computer readable media, such as memory 140 and/or some other type of medium, for storing instructions and/or data used by the one or more processors 146, 148 to perform servomechanism operations. The one or more computer readable media may include executable instructions corresponding to one or more operating systems used by the processor(s), such as a LINUX operating system and/or a reduced kernel of an operating system.

In one embodiment, the controller 108 receives feedback about the operation of the component. The feedback may be used as input to servomechanism operations. For example, the controller 108 may receive feedback from one or more off-board sensors 132. As used here, the term "off-board" means that an off-board sensor 132 is communicatively coupled with the controller 108 but is not part of the controller 108 itself. For example, the off-board sensor 132 may be a sensor physically attached or communicating with the component, such as a thermometer, tachometer, tilt sensor, current sensor, or any other kind of sensor configured to receive feedback about the operation of the component and provide the feedback to the controller 108.

Alternatively or in addition, the controller 108 may include one or more on-board sensors 138. As used here, the term "on-board" means that the on-board sensor 138 is part of the controller 108 itself. For example, if the controller 108 is a logic board, the on-board sensor 138 may be attached to the same logic board. The on-board sensor 138 may be a thermometer, tachometer, tilt sensor, current sensor, or any other kind of sensor configured to receive feedback about the operation of the component.

In one embodiment, the controller 108 is configured to apply electrical signals to the component, to modify the component's operation. For example, the controller 108 may include a motor driver 144 configured to transmit electrical signals to a motor 134 that causes the component to move. The particular electrical signals transmitted from the motor driver 144 to the motor 134 may help determine how the component moves (i.e., direction, speed, etc.). Further, the component may include more than one motor 134, and a combination of electrical signals to the various motors may help determine how the component moves. A motor driver 144 may be configured to transmit electrical signals to a single motor 134, or to multiple motors. For a component with more than one motor (for example, a component operating along more than one rail), more than one motor driver may be used.

In an embodiment, the controller 108 uses a motor 134 and off-board sensor 132 to perform servomechanism functions as follows. One or more processes executed by the controller 108 apply a voltage and/or current to a motor 134. An off-board sensor 132 (e.g., an encoder) provides feedback about the actual motion of the motor 134. The controller 108 uses the feedback to adjust the voltage and/or current applied to the motor 134. Adjusting the voltage and/or current in response to the feedback allows the controller 108 to achieve (or more closely approximate) the desired motion of the component being moved by the motor 134.

In one embodiment, the controller 108 is configured to control and receive feedback from various parts of the component, some of which may not be related to servomechanism operations. For example, the controller 108 may be configured to transmit electrical signals to, and receive electrical signals from, a bar code scanner 136. The bar code scanner 136 may be configured to read bar codes of items manipulated by the component within a module. For example, a hand 128 as illustrated in FIG. 1C may include a bar code reader. The bar code reader may be used to identify items stored in cells 120 as illustrated in FIG. 1B.

FIG. 1E is an illustration of a tape library system 154 in accordance with one embodiment. In this example, the tape library system 154 includes two modules: module 156 and module 158. The modules are connected along a vertical edge to form a single, modular unit. An upper rail 164 and lower rail 166 run the horizontal length of the tape library system 154, allowing a component 162 to access storage cells 160. Each of the storage cells 160 may be configured to accept tape drives and/or other storage media, as discussed above. In FIG. 1E, the storage cells 160 run the length of the tape library system 154 in both the front and back. The component 162 is a robot arm connected to the upper rail 164 and lower rail 166, allowing the component 162 to move along the rail under power of one or more motors. The component 162 also includes a robot hand, which moves vertically along the robot arm to access storage cells 160 at different heights in the tape library system 154. In one embodiment, the tape library system 154 includes more than one robot arm (not shown).

Figure 2:
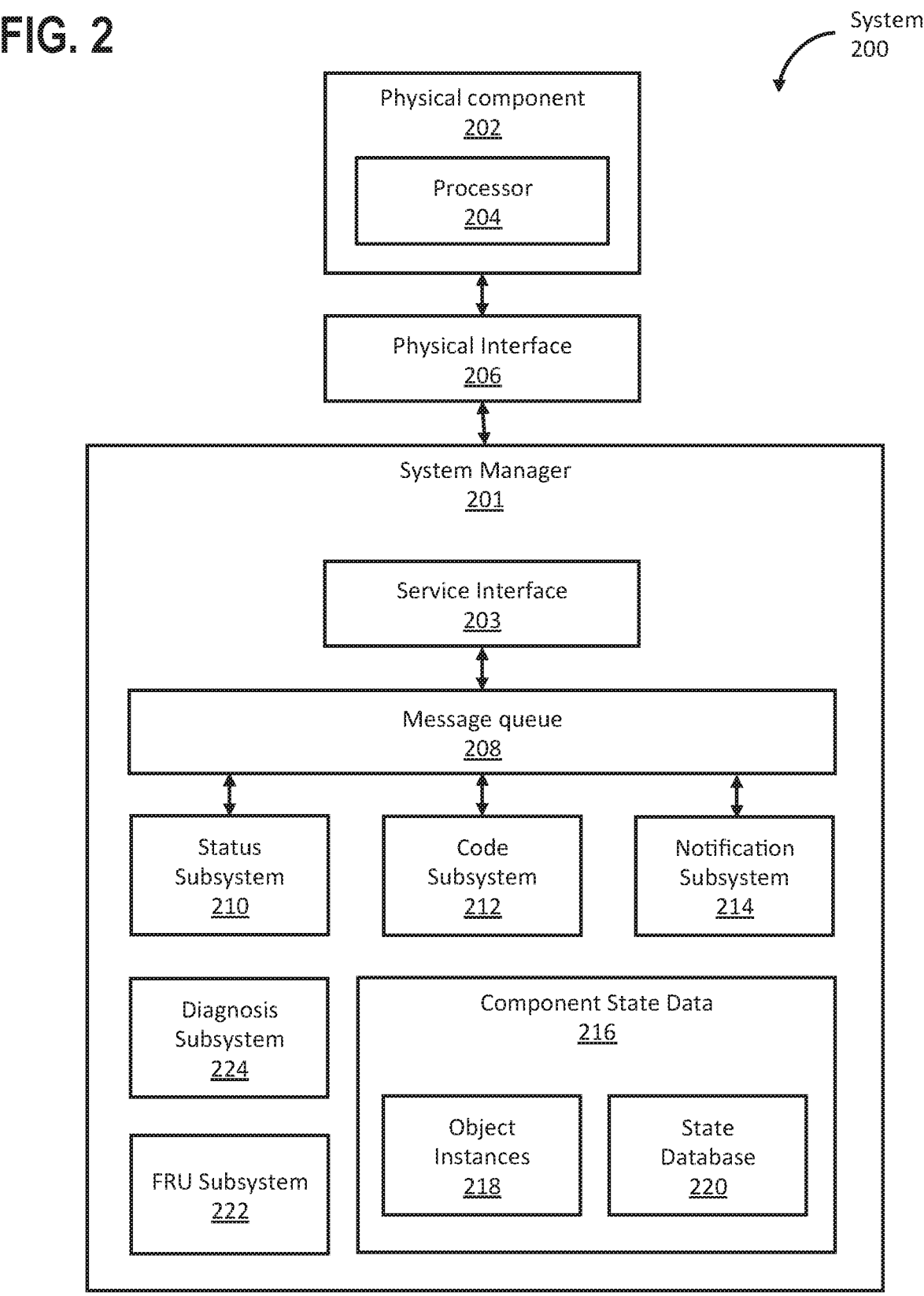
FIG. 2 is a block diagram illustrating a system in accordance with one embodiment.

FIG. 2 is a block diagram illustrating a system 200 in accordance with one embodiment. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 8, titled "Computer Networks and Cloud Networks."

In one embodiment, the system 200 includes a physical component 202. For example, if the system 200 is a tape library system, the physical component may be a robot arm. The physical component 202 includes a processor 204 used by the physical component 202 to perform various functions. Functions performed using the processor 204 may include sending push notifications as discussed in further detail below. In one embodiment, the processor 204 is part of a controller, as discussed in further detail above.

In one embodiment, the system 200 includes one or more components configured to discover and manage physical components (e.g., physical component 202), as discussed in further detail below. Specifically, the system 202 may include one or more modules, as discussed in further detail above, and a system manager 201 may be configured to discover and manage physical components used by the module(s).

In one embodiment, the system manager 201 and physical component 202 communicate with each other via a physical interface 206. The physical interface 206 may include any type of communication interface as described in further detail below. The physical interface 206 may include one or more pins with which the physical component 202 is coupled. The specific arrangement of pins and/or electrical signals applied by the physical component 202 to the pins may supply information about the physical component 202 to the system manager 201.

In one embodiment, the system manager 201 includes a service interface 203. The service interface 203 is an application programming interface (API) through which the system manager 201 provides services to the physical component 202. For example, the service interface 203 may include a representational state transfer (REST) API configured to receive messages from the physical component 202. Alternatively or in addition, the service interface 203 may include a Java API for extensible markup language (XML) web services (JAX-WS). Many different types of APIs may be used. In one embodiment, the system manager 201 receives push notifications from the physical component 202 via the service interface 203. Different types of push notifications are discussed in further detail below.

In one embodiment, the system manager 201 operates according to an asynchronous model, meaning that messages received via the service interface 203 may not be handled sequentially, and the physical component 202 may not wait for a response to a particular message. Specifically, messages received via the service interface 203 may be stored in a message queue 208. The system manager 201 may handle messages in the message queue 208 according to a particular policy, such as based on priority levels of different messages, First-In, First-Out (FIFO), First-In, Last-Out (FILO), or any other queuing policy or combination thereof. In one embodiment, the message queue 208 or another queue also is used for messages being sent from the system manager 201 to the physical component 202.

In one embodiment, the system manager 201 includes a status subsystem 210. The status subsystem 210 is configured to determine the operational statuses of physical components (e.g. physical component 202) in the system 200.

Specifically, the status subsystem 210 may determine the operational status of the physical component 202 based on receiving (or failing to receive) push notifications from the physical component 202. These particular push notifications may be thought of as "heartbeats" because they supply information about the physical component 202's operational health.

In one embodiment, the system manager 201 includes a code subsystem 212. The code subsystem 212 is configured to supply code updates to physical components, if the system manager 201 determines that the code running on a particular physical component is incompatible with one or more other elements. For example, the code may be newer, having one or more features not compatible with elements running older or "down-level" code versions. As another example, the code may be older, lacking one or more features required for compatibility with elements running newer or "up-level" code. The code subsystem 212 may store various versions of code (e.g., operating systems, applications, services, firmware, etc.) for different versions of components compatible with the system 200. If the physical component 202 is running incompatible code, then the code subsystem 212 may supply compatible code to the physical component 202, via the service interface 203, to be installed on the physical component.

In one embodiment, the system manager 201 includes a notification subsystem 214. The notification subsystem 214 is configured to receive push notifications from physical components (e.g. physical component 202) when physical components are added to the system 200. Based on receiving a push notification announcing the addition of a physical component, the notification subsystem 214 is configured to initiate registering the physical component with the system manager 201. Registering physical components is discussed in further detail below.

In one embodiment, the system manager 201 includes a diagnosis subsystem 224. The diagnosis subsystem 224 is configured to diagnose and/or handle problems with physical components. For example, the diagnosis subsystem 224 may be configured to perform error handling if a heartbeat from the physical component 202 is not duly received by the status subsystem 210.

In one embodiment, the system manager 201 includes field replaceable unit (FRU) utilities 222. If the physical component 202 is a FRU, the FRU subsystem 222 may be used to perform FRU-related functions for the physical component 202. For example, the FRU subsystem 222 may include functionality to update FRU identification information for the physical component 202.

In one embodiment, the system manager 201 includes component state data 216. The component state data 216 includes data describing the operational status of physical components in the system 200. Specifically, in one embodiment, each physical component is represented as an instance of a code object. For example, a robot arm may be represented as an instance of a Robot object, such as a Java class called "Robot." The component state data 216 may store the object instances 218 for each physical component represented as an instance of an object. Further, the component state data 216 may include a state database 220 storing state information associated with the object instances 218. For example, the state database 220 may include information describing the physical positions of various physical components, operations being performed by the physical components, code versions used by the physical components, heartbeat status, etc. In one embodiment, the status subsystem 210, code subsystem 212, notification subsystem 214, diagnosis subsystem 224, and/or FRU subsystem 222 are configured to retrieve information about physical components from the component state data 216, for example by calling functions or methods of object instances 218 and/or querying the state database 220. The various subsystems may also be configured to update the component state data 216 when changes are made to a physical component, such as updating a code version or determining that the physical component is nonresponsive.

In one embodiment, elements of the system 200, such as the system manager 201 and/or physical component 202, are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. DISCOVERY AND MANAGEMENT OF PHYSICAL COMPONENTS

Figure 3:
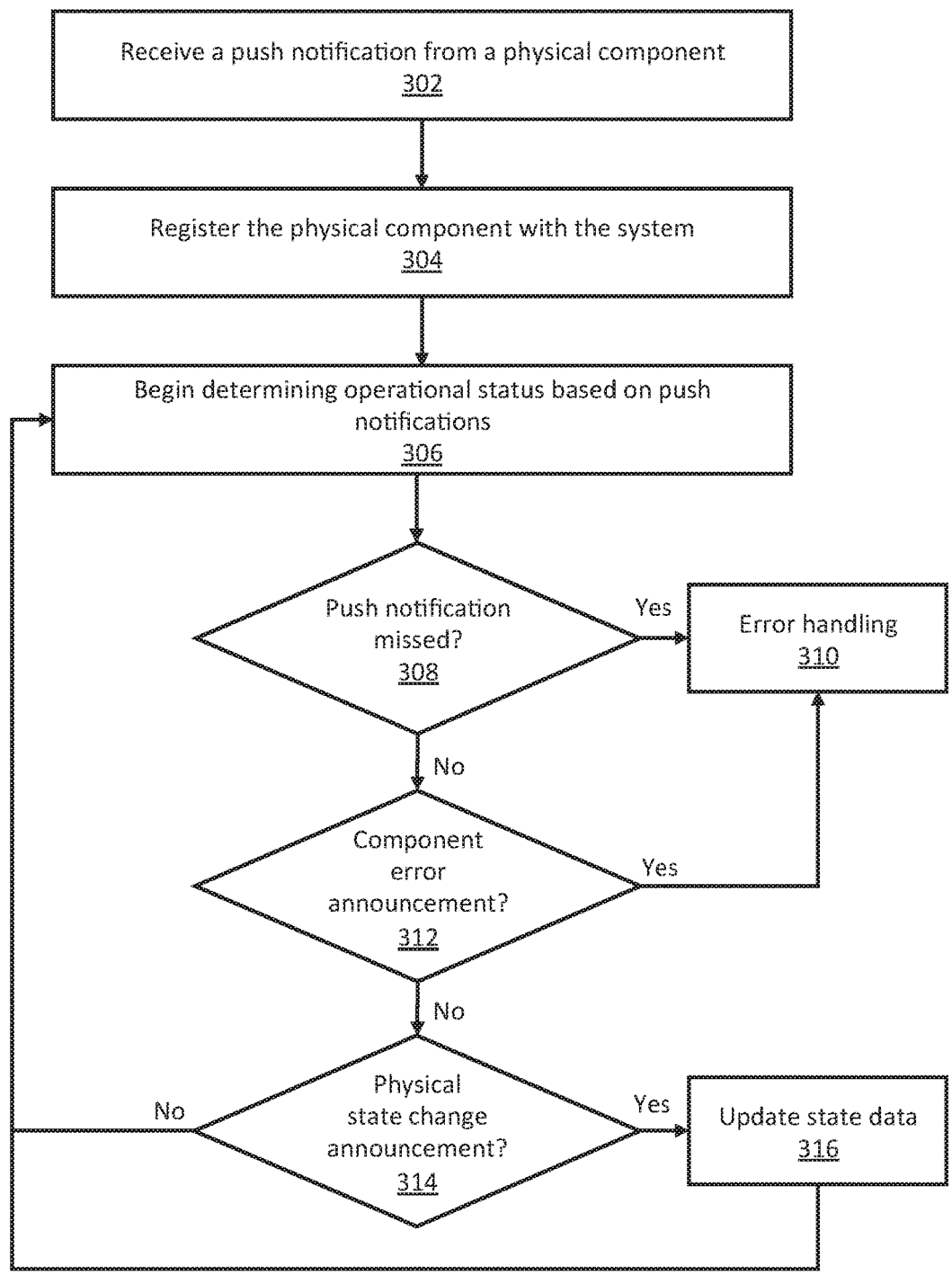
FIG. 3 illustrates a set of operations for discovery and management of a physical component in accordance with one embodiment.

FIG. 3 illustrates an example set of operations for discovery and management of physical components in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In one embodiment, a system receives a push notification from a physical component (Operation 302). Specifically, in one embodiment, the physical component transmits the push notification when it is added to a system. In effect, the push notification may be thought of as an "announcement" of the physical component's presence in the system. The announcement may include different types of information about the physical component, such as device type, hardware version, code version, controller card version, whether a drive is inserted (if the component is a cartridge), physical location in the system (e.g., module identifier and/or position within the module), power supply information, cooling fan status (e.g., present or not present, RPMs, etc.), video card presence, service door status (open or closed), network address (e.g., IP address), port number, information about an interface through which the component may receive messages, and/or any other type of information about the component. In one embodiment, the physical component is coupled to the system via an electrical connector. For example, the electrical connector may be a card edge connector, circular connector, high-density backplane connector, or some other type of electrical connector. The electrical connector may provide the physical component with power, signals, position information, or any other type of information, functionality, or combination thereof. Specifically, an electrical connector may supply electrical position information to the component. The electrical position information may allow the component to fully or partially determine its physical position in the system. For example, a particular type of module may have multiple locations capable of accepting a tape drive assembly. The term "tape drive assembly" may refer to a physical container, containing a tape drive and other components required to operate the tape drive. A connector on the tape drive assembly may couple with a connector inside the module. A set of the pins in the connector may provide data to the tape drive assembly about its physical location in the module. Specifically, data about the tape drive assembly's physical location may include information about which of multiple locations capable of accepting a tape drive assembly the component has been inserted into. This information may be provided to the system as part of the component's initial push notification. The system may receive the push notification from the physical device via a service interface, as described in further detail above. In one embodiment, the push notification represents the initial communication between the physical component and the system; there may not have been any messages transmitted between the physical component and the system before that point.

Many different types of components may be configured to announce their presence in the system. In a tape library system, components that announce their presence may include, for example: a module controller card; a network switch; a rail controller card; a robot controller card; a drive switch; a drive tray; a tape drive inside a drive tray; an identity card that provides information about a drive tray; and/or any other type of component. In general, a push notification may be received from any type of component with a processor, which may be located on a controller card, that is capable of executing instructions for transmitting a push notification that announces the component's presence in the system.

In one embodiment, the system is said to have "discovered" (i.e., become aware of) the physical component upon receipt of the push notification. Alternatively, "discovery" may be a more protracted process that involves gathering information about the component and preparing the system to manage the component's operation. Receiving the push notification may signal the beginning of the discovery process. In one embodiment, as part of the discovery process, based on the push notification received from the physical component, the system registers the physical component with the system (Operation 304). In general, registering the component may involve various operations needed to ensure that the system is fully aware of the component, that the component is up-to-date and ready to operate, and/or that the system is prepared to manage the component, including monitoring the component's operational status. Registering a component is discussed in further detail below.

In one embodiment, once the physical component is registered with the system, the system begins determining the component's operational status based on push notifications (Operation 306). Determining a component's operational status and/or performing other operations associated with the component, once the component is registered, may be thought of as "managing" the component. In one embodiment, the system does not proceed to begin determining the operational status of the component if the component is not successfully registered.

Specifically, in one embodiment, to determine a component's operational status, the system looks for push notifications from the component. The component may be configured to transmit the push notifications from time-to-time, to update the system on its operational status. The component may transmit the push notifications periodically, i.e. at regular intervals, and/or under certain conditions such as the completion of an operation. These push notifications may be thought of as "heartbeats" because they supply the system with information about the component's operational status. A heartbeat push notification may be as simple as an indication that the component is still active, or may supply additional information. For example, the heartbeat push notification may supply data from a temperature sensor, a power usage sensor, a fan sensor, or any other type of sensor. As another example, the heartbeat push notification may supply statistics from network switches. Many different types of information may be supplied in a heartbeat push notification.

In one embodiment, the system determines whether a push notification has been missed (Operation 308). For example, the system may determine that a push notification has not received within a predetermined maximum time period (e.g., within a predetermined time window following a previous push notification). Failure to receive a push notification from a component may indicate a failure condition. Accordingly, if a push notification is missed, the system may perform error handling (Operation 310). Error handling may involve attempting to establish communication with the component (e.g., using a ping or some other type of call-and-response mechanism), reinitializing the component, restarting the component, taking the component offline, and/or any other type of suitable error handling. Alternatively or in addition, error handling may involve notifying a system administrator (e.g., by email, text message, etc.) that an error has occurred.

In one embodiment, the physical component itself is capable of detecting an error condition and announcing the error condition (e.g., using a push notification) to the system. If the system determines that a component has announced an error condition (Operation 312), the system may initiate error handling (Operation 310). Error handling for a component-announced error may be the same as or different from error handling performed when a push notification is missed.

In one embodiment, the physical component may detect a state change (e.g., a change in physical position, code status, or other type of state change) and announce the state change (e.g., using a push notification) to the system. In an embodiment, if the system determines that the component has announced a state change (Operation 314), then the system updates state data associated with the component (Operation 316). For example, the system may update a state database as described above.

In one embodiment, determining the operational status of the component (Operation 306) continues until the system determines that a push notification has been missed (Operation 308) or the component announces an error (312). Determining the operational status of the component may also resume after error handling (Operation 310).

In one embodiment, using push notifications is an efficient way to discover and manage physical components. Push notifications may reduce system overhead, by reducing or eliminating the need for the system to perform polling. Further, push notifications may allow the system to receive updates about the operational status of a component asynchronously, thus avoiding latency associated with the call-and-response model typically used in polling.

4. REGISTERING A PHYSICAL COMPONENT

Figure 4:
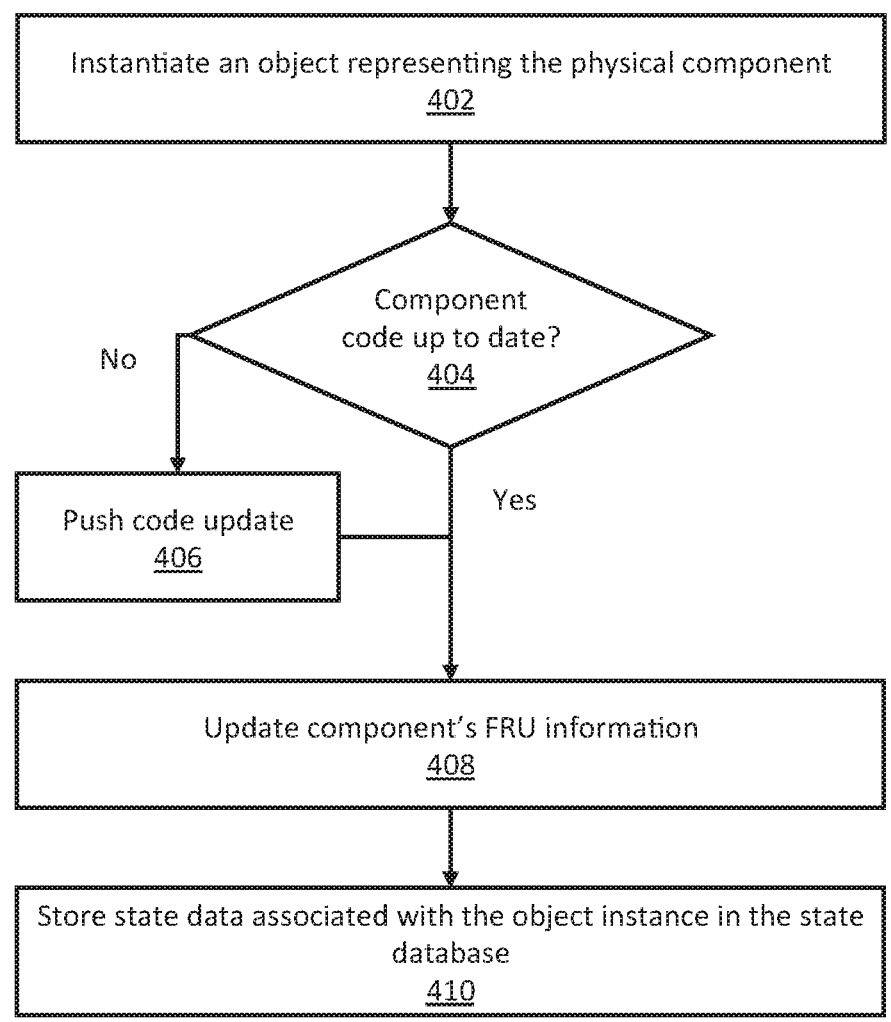
FIG. 4 illustrates a set of operations for registering a physical component in accordance with one embodiment.

FIG. 4 illustrates an example set of operations for registering a physical component in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In one embodiment, as discussed above, the system may represent different components as instances of corresponding object types. For example, in a tape library system, there may be objects with class names such as "Robot," "Controller," "Cell," etc. Registering a component may involve instantiating an object representing the physical component (Operation 402). The system may subsequently reference functions or methods in the object instance to manage the physical component.

In one embodiment, the system manages code installed on one or more physical components. Specifically, as part of registering the component, the system may determine whether the component's code is up to date (Operation 404). If the component's code is not up to date, then the system may push a code update to the component (Operation 406).

In one embodiment, if the physical component is a field-replaceable unit (FRU), then registering the component may involve updating the component's FRU information (Operation 408). Specifically, the FRU may include an electronic chip that stores historical information about the FRU, such as a history of field installations, code updates, etc. Updating the FRU information may involve pushing information to the FRU for storage on that chip. Alternatively or in addition, an FRU may store identity information about the FRU such as part numbers, part descriptions, serial numbers, and/or any other type of information about the FRU. Identity information about the FRU may be stored in a database. For example, identity information about the FRU may be stored in a state database as described above.

In one embodiment, the system manages physical components, in part, using stored state data. For example, the system may maintain a state database as described above. Registering a physical component may involve storing state data, associated with the object instance representing the physical object, in the state database (Operation 410).

In an embodiment, registering a particular component allows the system to imply the existence of other components. For example, a tape drive may be enclosed in a drive tray. The drive tray may include other components such as a drive controller card, a power supply, and/or other components supporting interaction between the tape drive and the tape library system. In an embodiment, the drive controller card announces itself to the system. Based on the drive controller card's announcement, the system may also register other components of the drive tray.

5. ILLUSTRATIVE EXAMPLE

FIG. 5 illustrates an example of a sequence of operations for discovery and management of a physical device in accordance with one embodiment. This example is provided for illustrative purposes only, and embodiments should not be construed as limited by this example.

As illustrated in FIG. 5, a timeline of events proceeds from top to bottom, with different times marked as T1, T2, etc. and corresponding descriptions alongside each time marking. At time T1, a system receives a push notification announcing the installation of a field-replaceable unit (FRU) in the system. In this example, suppose the system is a tape library system, with a system manager, and the FRU is a drive tray. The drive tray contains a drive controller card. The drive controller card announces the drive tray to the tape library system. At time T2, the system manager instantiates an object representing the drive controller card. Based on data received from the drive controller card (e.g., in the push notification announcement), the system manager determines that the drive controller card is running firmware that is newer than code used by other components in the tape library system, and therefore incompatible. Accordingly, at time T3, the system manager "updates" the drive controller card's firmware by pushing an older version of the firmware to the drive controller card. (Here, the term "update" does not necessarily mean that the firmware is more recent.)

At time T4, the system manager stores updated state data for the FRU in a state database. The state data includes identity information received from the FRU and also indicates the version of firmware installed on the FRU. At time T5, the system manager starts receiving push notifications from the FRU. Specifically, the FRU is configured to transmit heartbeat push notifications to the system manager periodically. At time T6, the system manager diagnoses a missed heartbeat push notification that was not received from the FRU as expected. Specifically, the system manager determines that a maximum amount of time has expired since the last heartbeat push notification from the FRU. To diagnose the missed push notification, the system manager queries the FRU. Based on a response by the FRU to the query, the system manager determines that the FRU is healthy and continues to monitor for push notifications.

At time T7, the system manager receives and processes an error notification from the FRU. For example, the system manager may receive a push notification from the FRU indicating that a processor in the FRU has failed. Based on the error notification, the system manager may attempt to reset the FRU, in an effort to recover the failed processor. At time T8, the FRU is replaced with another FRU, such as a different drive controller card. When the replacement FRU is installed in the tape library system, it announces itself to the tape library system and is registered with the system as described above.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 318 coupled to bus 602. Communication interface 318 provides a two-way data communication coupling to a network link 620 that is connected to a local network 622. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 318, which carry the digital data to and from computer system 600, are example forms of transmission media.

Computer system 600 can send messages and receive data, including program code, through the network(s), network link 620 and communication interface 318. In the Internet example, a server 630 might transmit a requested code for an application program through Internet 628, ISP 626, local network 622 and communication interface 318.

The received code may be executed by processor 604 as it is received, and/or stored in storage device 610, or other non-volatile storage for later execution.

8. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
    receiving, by a system comprising at least one module including a plurality of storage cells that are couplable to storage media, a first push notification from a drive controller card, the first push notification comprising an announcement that a drive tray has been physically coupled with a first storage cell of the plurality of storage cells within the module of the system via a connector in the module;
    wherein the drive controller card determines location information that indicates a physical location of the first storage cell of the plurality of storage cells based at least in part on the connector in the module;
    wherein the first push notification includes the location information that indicates the physical location of the first storage cell of the plurality of storage cells;
    responsive to receiving the first push notification from the drive controller card:
        registering, by the system, the drive controller card and one or more other components of the drive tray;
    receiving, by the system, a plurality of push notifications from the drive controller card; and
    determining, by the system, an operational status of the drive tray based on the plurality of push notifications from the drive controller card.

2. The medium of claim 1, wherein the operations further comprise:
    determining that registering is successful,
    wherein the system begins determining the operational status of the drive tray, based on the plurality of push notifications, only if the registering is successful.

3. The medium of claim 1, wherein registering the drive controller card comprises:
    instantiating, by the system, an object instance representing the drive tray; and
    storing, by the system, state data associated with the object instance in a database.

4. The medium of claim 3, wherein the operations further comprise:
    receiving, by the system, a second push notification from the drive controller card,
        the second push notification indicating a change in a physical state of the drive tray; and
    updating, by the system, state data associated with the object instance in the database to reflect the change in the physical state of the drive tray.

5. The medium of claim 1, wherein the operations further comprise:

determining, by the system, that an expected push notification was not received from the drive controller card within a time window of a last-received push notification of the plurality of push notifications; and handling an error condition based on the determining that the expected push notification was not received.

6. The medium of claim 1, wherein registering the drive controller card comprises:
determining, by the system, that code used by the drive controller card is incompatible; and
updating, by the system, code used by the drive controller card based on determining that code used by the drive controller card is incompatible.

7. The medium of claim 6, wherein determining that code used by the drive controller card is incompatible is based on a code version provided by the drive controller card in the first push notification.

8. The medium of claim 1, wherein the storage cells are couplable to field-replaceable units (FRU) and the system is a tape library system.

9. The medium of claim 1, wherein the first push notification further includes a port number, a network address, a device type, a hardware version, and a code version.

10. The medium of claim 1, wherein the location information is provided by a set of pins in the connector and wherein the system further controls a robotic arm based on the location information to access storage media from the drive tray.

11. A system comprising:
at least one module including a plurality of storage cells that are couplable to storage media;
one or more hardware processors; and
one or more non-transitory computer-readable media storing instructions, which when executed by the one or more hardware processors, cause execution of operations comprising:
receiving a first push notification from a drive controller card, the first push notification comprising an announcement that a drive tray has been physically coupled with a first storage cell of the plurality of storage cells within the at least one module of the system via a connector;
wherein the drive controller card determines location information that indicates a physical location of the first storage cell of the plurality of storage cells based at least in part on the connector in the module;
wherein the first push notification includes the location information that indicates the physical location of the first storage cell of the plurality of storage cells;
responsive to receiving the first push notification from the drive controller card:
registering, by the system, the drive controller card and one or more other components of the drive tray;
receiving, by the system, a plurality of push notifications from the drive controller card; and
determining, by the system, an operational status of the drive tray based on the plurality of push notifications from the drive controller card.

12. The system of claim 11, wherein the operations further comprise:
determining that registering is successful,
wherein the system begins determining the operational status of the drive tray, based on the plurality of push notifications, only if the registering is successful.

13. The system of claim 11, wherein registering the drive controller card comprises:

instantiating, by the system, an object instance representing the drive tray; and
storing, by the system, state data associated with the object instance in a database.

14. The system of claim 13, wherein the operations further comprise:
receiving, by the system, a second push notification from the drive controller card, the second push notification indicating a change in a physical state of the drive tray; and
updating, by the system, state data associated with the object instance in the database to reflect the change in the physical state of the drive tray.

15. The system of claim 11, wherein the operations further comprise:
determining, by the system, that an expected push notification was not received from the drive controller card within a time window of a last-received push notification of the plurality of push notifications; and
handling an error condition based on the determining that the expected push notification was not received.

16. The system of claim 11, wherein registering the drive controller card comprises:
determining, by the system, that code used by the drive controller card is incompatible; and
updating, by the system, code used by the drive controller card based on determining that code used by the drive controller card is incompatible.

17. The system of claim 16, wherein determining that code used by the drive controller card is incompatible is based on a code version provided by the drive controller card in the first push notification.

18. The system of claim 11, wherein the first push notification further includes a port number, a network address, a device type, a hardware version, and a code version.

19. The system of claim 11, wherein the location information is provided by a set of pins in the connector and wherein the system further controls a robotic arm based on the location information to access storage media from the drive tray.

20. A method comprising:
receiving, by a system comprising at least one module including a plurality of storage cells that are couplable to storage media, a first push notification from a drive controller card, the first push notification comprising an announcement that a drive tray has been physically coupled with a first storage cell of the plurality of storage cells within the module of the system via a connector in the module;
wherein the drive controller card determines location information that indicates a physical location of the first storage cell of the plurality of storage cells based at least in part on the connector in the module;
wherein the first push notification includes the location information that indicates the physical location of the first storage cell of the plurality of storage cells;
responsive to receiving the first push notification from the drive controller card:
registering, by the system, the drive controller card and one or more other components of the drive tray;
receiving, by the system, a plurality of push notifications from the drive controller card; and
determining, by the system, an operational status of the drive tray based on the plurality of push notifications from the drive controller card.

* * * * *